United States Patent

[11] 3,571,879

| [72] | Inventors | Josef Kleinhenz;<br>Franz Muller; Hans Kober; Burkhard Treutlein, Schweinfurt, Germany |
|---|---|---|
| [21] | Appl. No. | 760,588 |
| [22] | Filed | Sept. 18, 1968 |
| [45] | Patented | Mar. 23, 1971 |
| [73] | Assignee | Kugelfischer George Schafer & Company Schweinfurt, Germany |
| [32] | Priority | Sept. 21, 1967 |
| [33] | | Germany |
| [31] | | P 16 25 566.6 |

[54] METHOD FOR MANUFACTURING ROLLING TYPE BEARINGS
7 Claims, 4 Drawing Figs.

[52] U.S. Cl.................................................. 29/148.4, 29/434
[51] Int. Cl.................................................. B23p 11/00, B23p 19/00
[50] Field of Search......................................... 29/148.4, 2 01, 148.4 (A), 149.5, 434

[56] References Cited
UNITED STATES PATENTS

| 2,910,765 | 11/1959 | Heim | 29/148.4 |
| 2,913,810 | 11/1959 | Heim | 29/148.4 |
| 2,929,131 | 3/1960 | McCloskey | 29/201X |
| 3,036,365 | 5/1962 | Hanau | 29/148.4 |
| 3,109,223 | 11/1963 | McCloskey | 29/201X |

*Primary Examiner*—Thomas H. Eager
*Attorney*—Stevens, Davis, Miller & Mosher

ABSTRACT: The invention is directed to a method for assembling the inner and outer races of ball or roller type bearings by plastic deformation whereby the maximum number of rolling elements may be mounted within the trackway between the races and whereby an exact and predetermined clearance is obtained in spite of the elastic recovery of the plastically deformed races and whereby either the rolling element size or the trackway shoulders may be increased to a maximum in order to increase the axial loading capacity of the bearing.

PATENTED MAR 23 1971 3,571,879

METHOD FOR MANUFACTURING ROLLING TYPE BEARINGS

The invention relates to a method for manufacturing ball-and-socket joints and rolling type bearings, especially cageless ball or roller bearings, (i.e., bearings provided with their full complement of balls or rollers) involving plastic deformation of one or each bearing race in a radial or axial direction, the races being already provided with at least one or with several tracks or ball or roller grooves having shoulders or lips on both axial sides thereof.

In order to be able to produce ball- or roller-bearing races provided on both axial sides thereof with lips or shoulders and with the space between the race tracks largely or wholly filled with balls or rollers, without having to provide insertion notches or other permanent deformations, there are already several known expedients.

According to German Pat. Specification No. 184,024 the insertion of a large number of balls is achieved by bringing the races artificially to different temperatures so as to enlarge the space between them to receive the balls. According to German Pat. Specification No. 184,025 the enlargement of the space can also be effected by elastic distortion of the races. However, these known expedients present drawbacks in so far as, where races are used having high shoulders or lips, the number of balls or rollers that can be inserted can only be increased to a minimal extent and so it is not possible to obtain a full complement of balls or rollers. This full complement can only be obtained if one provides lips or borders of very low profile, at least on one side of the races. But this has the further disadvantage that in ball bearings the radial and/or axial load capacity, and in roller bearings the axial load capacity, in the direction of the small shoulders or lips is reduced.

Later, as disclosed in U.S. Pat. No. 1,080,169 and Austrian Pat. Specification No. 231,249 it was proposed to overcome these drawbacks by causing contraction of the outer race or expansion of the inner race by plastic deformation after assembly of the various components, so as to prevent the balls or rollers from falling out and good, practical bearings were produced. This method was further developed as shown by U.S. Pat. Nos. 2,913,810; 2,929,131; 3,036,365; 3,109,223 and 3,123,413, and by German published Specification No. 1,245,653, and improvements were obtained in so far as the use of hard steels and suitable deformation processes enabled raceways of improved surface qualities and accuracy to be produced.

This result was achieved, for example, by arranging that either the outer or inner race, already provided with a finish-machined track for the balls or rollers, was so markedly plastically deformed that the cooperating other race was also deformed at an increased loading in the region of its elastic limit. Since, with this method, there was often a danger of exceeding the elastic limit, there is employed, according to U.S. Pat. Nos. 2,997,775 and 3,063,133, a mandrel that expands the inner race to a predetermined and measurable extent, the mandrel being removed after the rolling around of the outer race, whereupon the inner race recovers elastically or springs back, thanks to its resiliently retained capacity to recover, and the provision of the desired clearance is thus possible.

As the magnitude of the elastic recovery of all these components is not accurately predictable, in the just-mentioned method the attainment of the desired bearing clearance was not possible to the degree of accuracy needed for subsequent installation of the bearing. In particular, in striving for a small clearance or for a degree of preloading the unavoidable manufacturing tolerances on the individual components resulted the elastic limit being exceeded at least at certain points. This led to damage to the mating surfaces and a reduction in the running quality and life of the bearing.

In order to avoid these drawbacks and at the same time to be able to fill the space between the tracks or raceways completely or nearly completely with rolling bodies a method of manufacture and means for carrying out the method are herein provided whereby, simultaneously with the known plastic deformation in a radial or axial direction of one or both bearing races which are already provided with at least one or more running grooves or tracks having lips or shoulders on both sides, a temperature drop is maintained between the outer race and the inner race. This allows the amount of the plastic deformation to be reduced by the extent of the thermal expansion obtained by the elevated temperature. This means furthermore that bearings with small clearance or made from materials having a high coefficient of thermal expansion can in fact be produced with a degree of preloading without the other bearing components having to be deformed. Thus, the danger of damaging these other components during manufacture is eliminated.

The effect of this method is further enhanced by inserting the balls or rollers while the latter are at as low a temperature as possible. Since, in the method according to the invention, only a single component of the bearing to be produced in deformed and all the remaining components such as the balls or rollers, the cage, and the other race undergo no deformation during assembly of the bearing, there is only one component (namely, the item deformed) which springs back or recovers. On the basis of this fact, in contrast to the methods known hitherto in which all the components are deformed and consequently all recover to a greater or lesser extent, a desired bearing clearance can be attained with a much greater degree of accuracy. Even if one confines the whole of the deformation to only one of the races, in order to reduce the bearing clearance tolerances, the accuracy cannot with the previously known methods, be substantially improved.

By virtue of the novel method disclosed herein, embodying the simultaneous application of heat and plastic deformation to a single component to be deformed, part of the dimensional change is induced by the transient thermal expansion, so that only a small part of the dimensional change has to be induced by plastic deformation.

A further advantage of the method according to this invention is that the temperature drop can be chosen so that on completion of the deformation process and on completion of the elastic recovery of the deformed component the desired bearing clearance or degree of preloading is arrived at on the basis of the contraction of the cooling component, and the term "bearing clearance" is intended to mean not only radial but also axial play of the races.

If one uses shoulders or lips that are as radially high as possible in this kind of assembly of bearings, it is advantageous, according to a preferred form of the invention, to effect the temperature differential before assembling the races together with the balls or rollers. The shoulders or lips can thereby be made higher by an amount equal to the thermal expansion of the races. Alternatively, one could insert balls or rollers of greater diameter between the races. In either case there results an increased load-bearing capacity.

According to a further feature of the invention, it is possible to make the two races of different materials having different coefficients of thermal expansion and different plastic deformability, that race which is to be deformed having the higher coefficient of thermal expansion and having a higher degree of plastic deformability than that bearing component which remains nondeformed, of which the nondeformed race can for example be made of ball bearing steel. In this way it is possible to combine the desired characteristics in an optimum manner.

To carry out the plastic deformation of a bearing race a press die is used which has a conical shape at its entry end and diminishes to a cylindrical shape.

The bearing race or ring that is moved through the die in an axial direction is reduced in the conical portion at the entry end of the die from a large outside diameter to a smaller outside diameter. By this kind of deformation the crystalline structure of the material of the race is compressed and refined in the manner of a material being worked in a press, and so the strength and durability of the race are augmented.

Preferably, the die also has an outwardly divergent frustoconical portion at its exit end, following the cylindrical portion, and has a base diameter somewhat greater than the outside diameter of the deformed race after its elastic recovery. By this construction, there is avoided the danger of the formation of cracks or flaws in the bearing race as it emerges deformed from the cylindrical portion and recovers somewhat elastically, at the instant when the race has already half emerged from the cylindrical portion of the die. It has turned out in practice that the parts of the races emerging from the die expand or contract to such an extent that the races burst into two parts splitting at their weakest points, i.e., along a radial section through the deepest parts of the raceway grooves.

The manufacture of the bearing will now be described in detail with reference to the accompanying drawings wherein.

Figure 1:
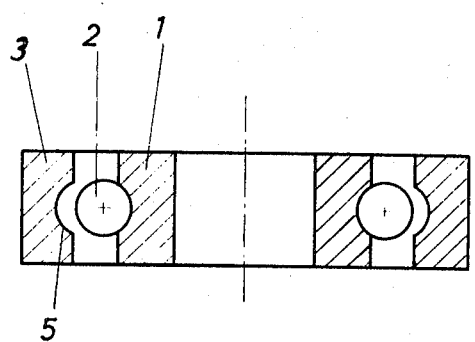
FIG. 1 is a sectional view through a preassembled radial groove ball bearing with a large outer race.
Figure 2:
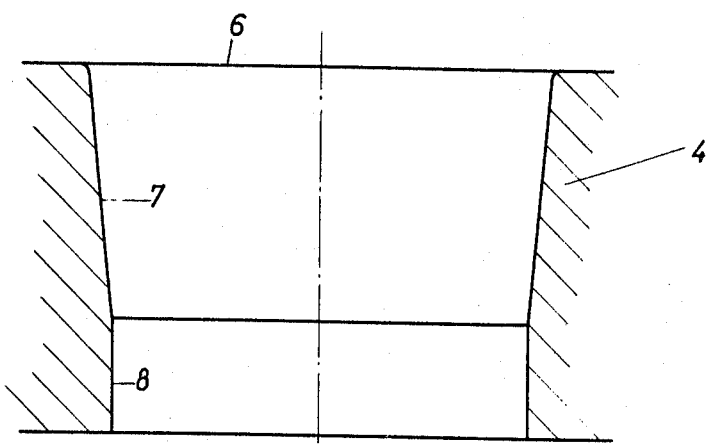
FIG. 2 is a sectional view through a conical press die, by means of which the outer race of FIG. 1 is to be plastically deformed.
Figure 3:
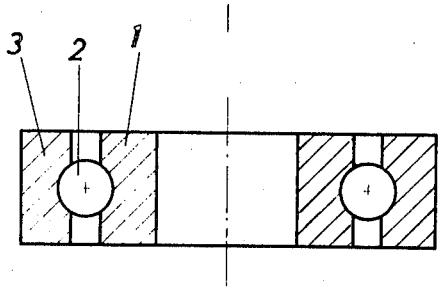
FIG. 3 shows the finished bearing in cross section.

The formation of a cageless bearing, i.e., a bearing with a full complement of balls, is illustrated with reference to a radial groove ball bearing. In FIG. 1 is shown a hardened and finish-machined inner race 1, of which the raceway or track is fully occupied by balls held in their desired positions by auxiliary tools (not shown). The outer race 3 is of enlarged diameter for purposes of assembly. In order to allow the outer race to be fitted over the rolling bodies already on the inner race, the diameter of at least one shoulder of the outer race must be greater than or equal to the diameter of the outer circumscribing circle of the balls. Such a preassembled bearing is then forced through a die 4, as shown in FIG. 2, of which the conical portion gradually compresses the outer race so that the track or raceway 5 of the outer race 3 is progressively brought, though not immediately, directly towards the circumscribing circle of the ring of balls, until it come into engagement with the balls. This results in the production of the finished bearing, as illustrated in FIG. 3. In choosing a suitable material for the outer race the plastic deformation properties thereof can be related to enhanced strengthening or hardening of the outer race.

In order to be able to attain the desired bearing clearance or degree of preloading with improved accuracy and at any desired size, a temperature differential is set up from the outer race 3 to the inner race 1. Preferably, the race that is to be deformed is also the one that is heated since the heating lowers its strength, elastic limit and modulus of elasticity. In the present case, this is the outer race 3, which can if necessary be made of a material having a particularly high coefficient of thermal expansion and having increased plastic deformability associated with an increase in hardness. By use of this method, it is above all possible to obtain smaller bearing clearance or degrees of preloading, in so far as the change in dimensions produced by the heating does not have to be achieved by additional plastic deformation. In the search for accuracy of the clearances the changes in dimensions obtainable by heating can be controlled much more closely than by the plastic deformation of several components, each of which exhibit elastic recovery or spring-back.

If the outer race is already heated prior to assembly as shown in FIG. 1, it is possible either to employ shoulders of increased radial height or balls of increased size, as the space between the shoulders of the inner race and the outer race is then greater by the amount of the thermal expansion. Higher shoulders result primarily in improved axial load-carrying capacity. In bearings having a substantially full complement of balls the use of larger balls signifies improved radial load-carrying capacity. The heating of the outer race within the conical bushing 4 is a simple way of doing it. This method must be used chiefly when the race that is to be deformed is only allowed to be subjected to elevated temperatures for a short period of time.

The method illustrated for the manufacture of grooved ball bearings is naturally equally applicable to the production of roller-bearings and indeed of ball-and-socket joints having domed bearing surfaces, in which the same problems arise.

The apex angle of the cone that defines the frustoconical portion at the input face of the die illustrated in FIG. 2 lies between 0.1 and 5°. The base diameter 6 of the cone 7 is somewhat larger than the outside diameter of the bearing race to be deformed, in order to ensure easy entry of the race into the die. The frustoconical portion 7 is followed by a cylindrical portion 8 of a length equal to or somewhat greater than the axial length of the bearing race.

Figure 4:
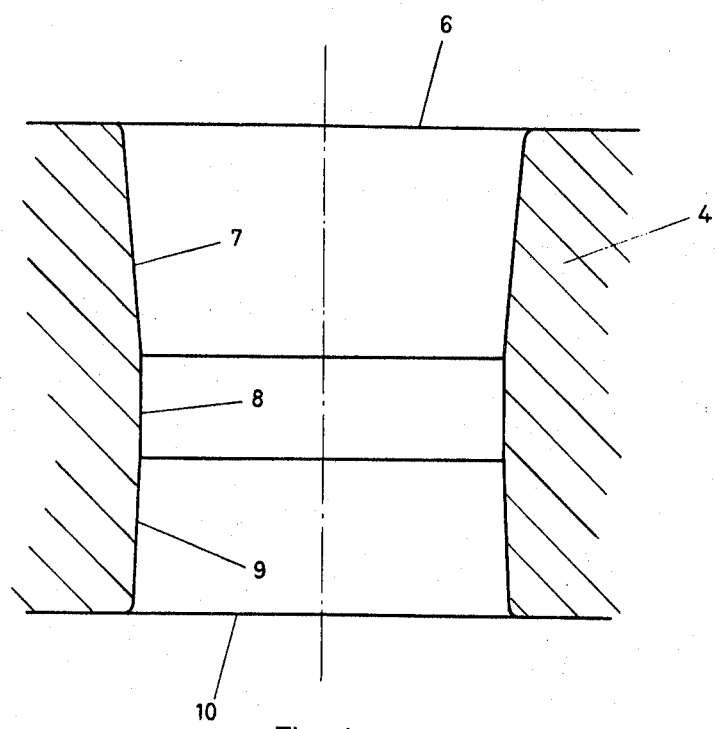
FIG. 4 is an axial sectional view through a preferred further embodiment of a conical press die.

The die 4 illustrated in FIG. 4 has at its exit end, following the cylindrical portion 8, an outwardly divergent frustoconical portion 9. The base diameter 10 of the cone 9 is somewhat greater than the outside diameter which the plastically deformed outer race reaches after its elastic recovery on emerging from the cylindrical portion. The apex angle of the cone that defines the frustoconical portion 9 at the outlet face is about 2°.

The race emerging from the cylindrical portion is embraced by the cone 9 until the deformed race has reached the outside dimensions determined by its elastic recovery. The cone 9 thus prevents the race 3 from being able to expand suddenly on emerging from the cylindrical portion 8, and, instead, allows the race 3 to spring back slowly to its final size. In this way the race 3 is prevented from expanding suddenly on emerging from the cylindrical portion, which could lead to the formation of cracks or even to the race bursting apart into two halves along the radial plane that passes through the root of the track or raceway 5.

The axial heights of the frustoconical portions 7, 9 are determined simply by the sizes of their base diameters 6, 10 and the diameter of their smaller ends and by the value of the apex angles of their generating cones. Specifically, the axial height of each frustoconical portion is directly proportioned to one-half the difference between the diameters of its smaller and larger ends, and inversely proportional to the tangent of half the apex angle of the relevant cone.

It is to be understood that although details have been given relative to preferred modes of realization, the invention is intended to cover all modifications, substitutions, equivalents, etc., which are obvious or fall within the purview of one skilled in the art.

We claim:

1. An improved method for assembling the inner and outer races of rolling type bearing means such as ball or roller bearing and ball-and-socket type joints, wherein the races include axially spaced-apart radially extending shoulder means defining a trackway between the races for the rolling elements, said method comprising the steps of:
    a. assembling the inner and outer races with the rolling elements therebetween and with the shoulders on the outer race circumscribing an inner circle of larger diameter than the circle circumscribing the outermost periphery of the rolling elements;
    b. plastically deforming one of the races in a radially direction until the shoulders embrace said rolling elements; and,
    c. maintaining the temperature of the outer race higher relative to that of the inner race during the plastic deforming of the outer race.

2. The method of claim 1, wherein the temperature difference is maintained during the plastically deforming of the races of such a magnitude that the difference between the diameters of the outer race and the inner race decreases through thermal change to specified dimensions upon compensation of the said temperature difference and wherein the different temperatures of the races are balanced out to ambient temperature after the plastically deforming.

3. The method of claim 2, wherein said temperature difference is of such a magnitude that upon compensating said temperature difference the difference between the diameters of the outer race and the inner race decreases to an extend whereby a degree of preloading is present in the bearing.

4. The method of claim 2, wherein said temperature difference is of such a magnitude that upon compensating said temperature difference the difference between the diameters of the outer race and the inner race decreases to an extent whereby there is a clearance between the races and the rolling elements therebetween.

5. The method of claim 2, wherein said temperature difference is produced before the assembly pursuant to step (a) in claim 1.

6. The method of claim 2, wherein said temperature difference is produced while the outer race is being plastically deformed.

7. The method of claim 1, wherein the inner and outer races are selected to be of respective different materials having different coefficients of thermal expansion and different plastic deformability characteristics.